US012747109B2

(12) United States Patent
Nunn et al.

(10) Patent No.: US 12,747,109 B2
(45) Date of Patent: Sep. 29, 2026

(54) AUTOMATIC LANE ADJUSTMENT SYSTEM

(71) Applicant: ILLINOIS TOOL WORKS INC., Glenview, IL (US)

(72) Inventors: J. Mark Nunn, Simpsonville, SC (US); Joshua Corneroli, Greer, SC (US); John Paul Laskis, Simpsonville, SC (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 18/921,892

(22) Filed: Oct. 21, 2024

(65) Prior Publication Data

US 2025/0136381 A1 May 1, 2025

Related U.S. Application Data

(60) Provisional application No. 63/545,652, filed on Oct. 25, 2023.

(51) Int. Cl.
*B65G 21/20* (2006.01)
*B65B 59/00* (2006.01)

(52) U.S. Cl.
CPC ........ *B65G 21/2072* (2013.01); *B65B 59/005* (2013.01); *B65G 2201/0244* (2013.01); *B65G 2201/0252* (2013.01)

(58) Field of Classification Search
CPC ........ B65G 21/2072; B65G 2201/0244; B65G 2201/0252; B65B 59/005
USPC ........................................................ 198/836.3
See application file for complete search history.

(56) References Cited

U.S. PATENT DOCUMENTS

| | | | | |
|---|---|---|---|---|
| 4,986,056 | A * | 1/1991 | Evans | B65B 59/003 53/247 |
| 6,305,528 | B1 * | 10/2001 | Leonard | B65G 21/2072 198/836.3 |
| 2010/0200370 | A1 * | 8/2010 | Rausch | B65G 47/086 198/571 |
| 2012/0168284 | A1 * | 7/2012 | Pawelski | F15B 15/1404 198/836.3 |
| 2013/0220777 | A1 * | 8/2013 | Mauger | B65G 21/10 198/817 |

FOREIGN PATENT DOCUMENTS

| | | | | |
|---|---|---|---|---|
| CN | 220265116 U | * 12/2023 | B65G 21/2072 |
| DE | 10146447 C1 | * 4/2003 | B65G 47/088 |
| EP | 3656706 B1 | * 7/2021 | B65G 43/08 |
| EP | 4218401 A1 | * 8/2023 | A01G 9/088 |
| WO | WO-2012090079 A1 | * 7/2012 | B65G 19/24 |

* cited by examiner

*Primary Examiner* — James R Bidwell
(74) *Attorney, Agent, or Firm* — Pauley Erickson & Swanson

(57) ABSTRACT

A system, method and apparatus for adjusting lanes in a conveyor system including a conveyor having opposing outer side walls and a plurality of uprights along the side walls and two or more lane dividers positioned between the side walls. One or more rails are positioned between opposite uprights and a scissor mechanism is positioned along the rails and connected with respect to the lane dividers, the scissor mechanism configured to independently adjust lane width and offset.

18 Claims, 3 Drawing Sheets

AUTOMATIC LANE ADJUSTMENT SYSTEM

CROSS REFERENCE TO RELATED APPLICATION

This application claims the benefit of U.S. Provisional Application, Ser. No. 63/545,652, filed on 25 Oct. 2023. The co-pending provisional application is hereby incorporated by reference herein in its entirety and is made a part hereof, including but not limited to those portions which specifically appear hereinafter.

BACKGROUND OF THE INVENTION

Field of the Invention

This invention relates generally to a system, method, and apparatus for automatically adjusting lanes of a conveyor system.

Description of Prior Art

Conventional conveyor systems may include one or more lanes for separation and travel of individual conveyed products, such as cartons, bottles, cans, boxes, etc. The conveyor lanes are typically adjustable with physical lane spacers and related hardware. Current systems require operators to remove lane spacers, manually move the lanes into position, and then install new lane spacers. This process is time and labor consuming, requires additional onsite storage, and causes production delays.

SUMMARY OF THE INVENTION

The invention generally relates to a system, method and apparatus for automatically adjusting lanes of a conveyor system.

A preferred embodiment utilizes an automated changeover process for laned conveyers. This process can either be done automatically via motors or manually, for instance with a hand-crank. The subject invention can adjust lanes to fit various conveyed product, such as containers like bottles or cans, widths and offsets.

In a preferred embodiment, there are two driven ACME threads: one for the lane width adjustments, and the other for offset. The use of the ACME threads creates a non-back-driveable system so that the forces of the conveyed products acting on the lanes will not alter the lane positions.

The width adjustment is preferably controlled via a scissor system. This method allows the lanes to all remain equal in width throughout the changeover process. The change in offset is made possible by mounting the entire scissor system on linear slides.

The entire scissor mechanism is preferably mounted to uprights and repeated down the length of the lane dividers. At least a portion, and preferably all, of the width and offset ACME threads are tied together via chains and sprockets, respectively. The resulting system provides the ability to move the lane width and offset independent of each other.

Other objects and advantages will be apparent to those skilled in the art from the following detailed description taken in conjunction with the appended claims and drawings.

DETAILED DESCRIPTION OF THE INVENTION

Figure 1:
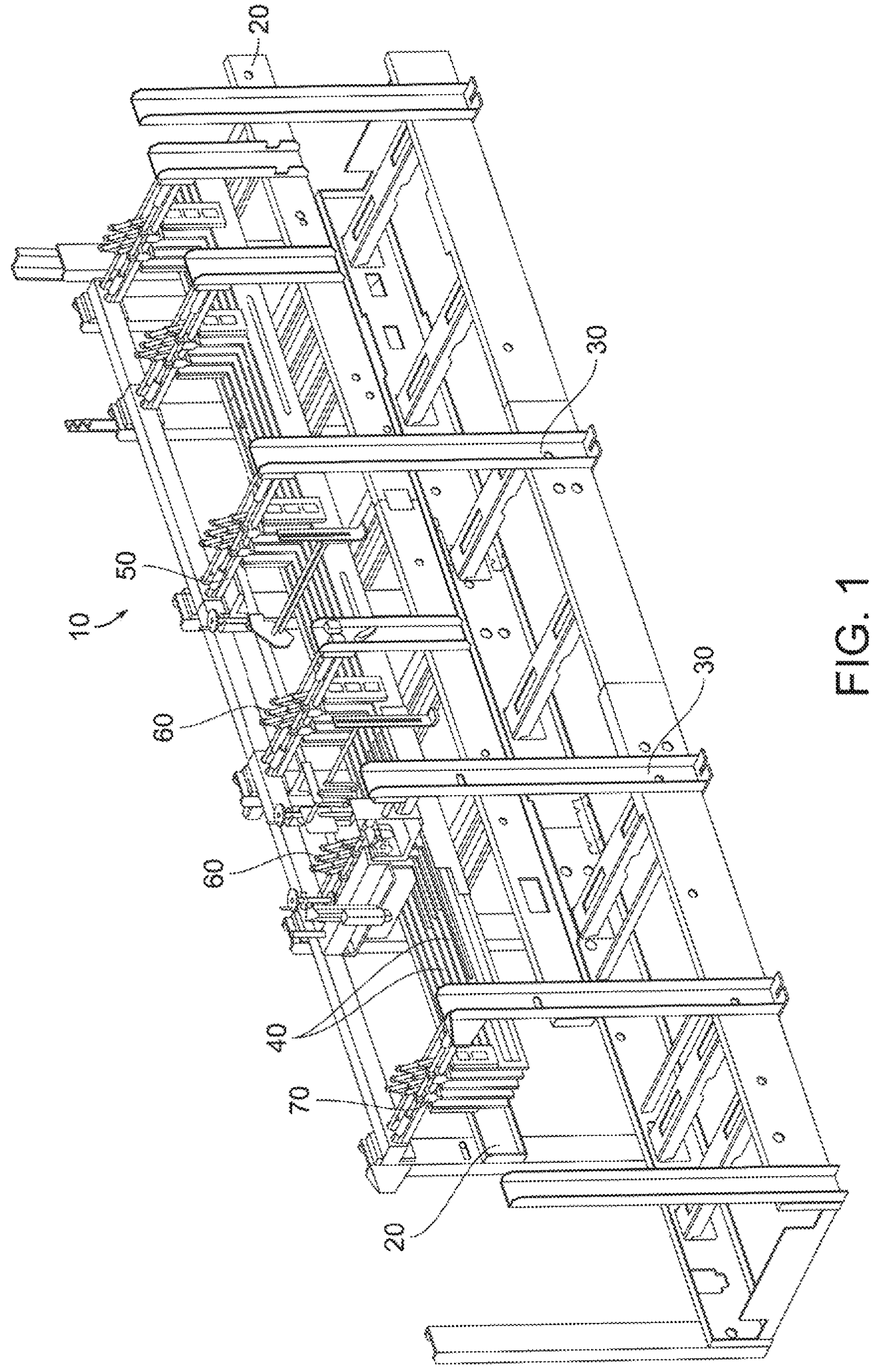
FIG. 1 shows a side perspective view of an automatic lane adjustment system according to one embodiment.
Figure 2:
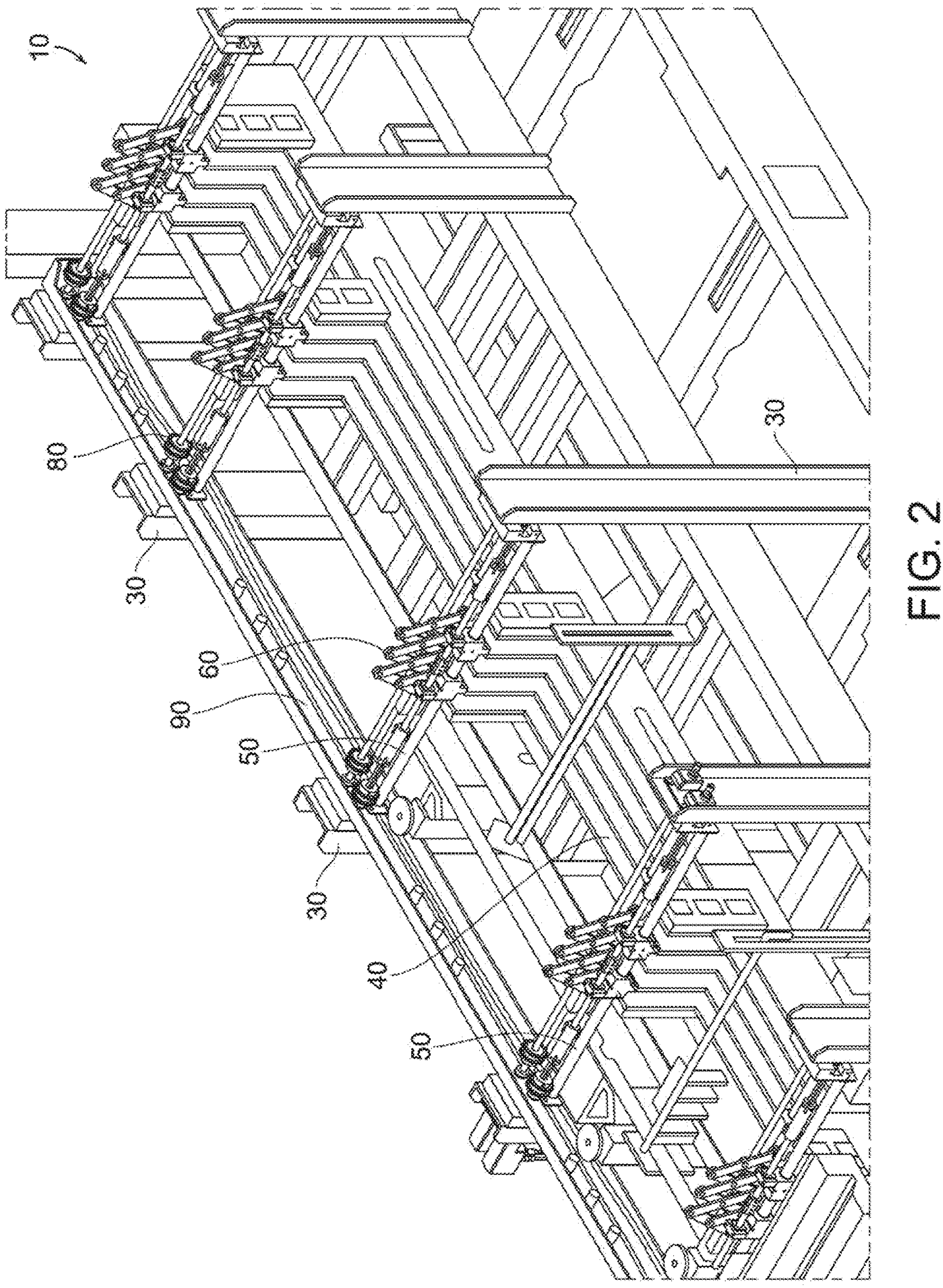
FIG. 2 shows a top perspective view of an automatic lane adjustment system according to one embodiment.
Figure 3:
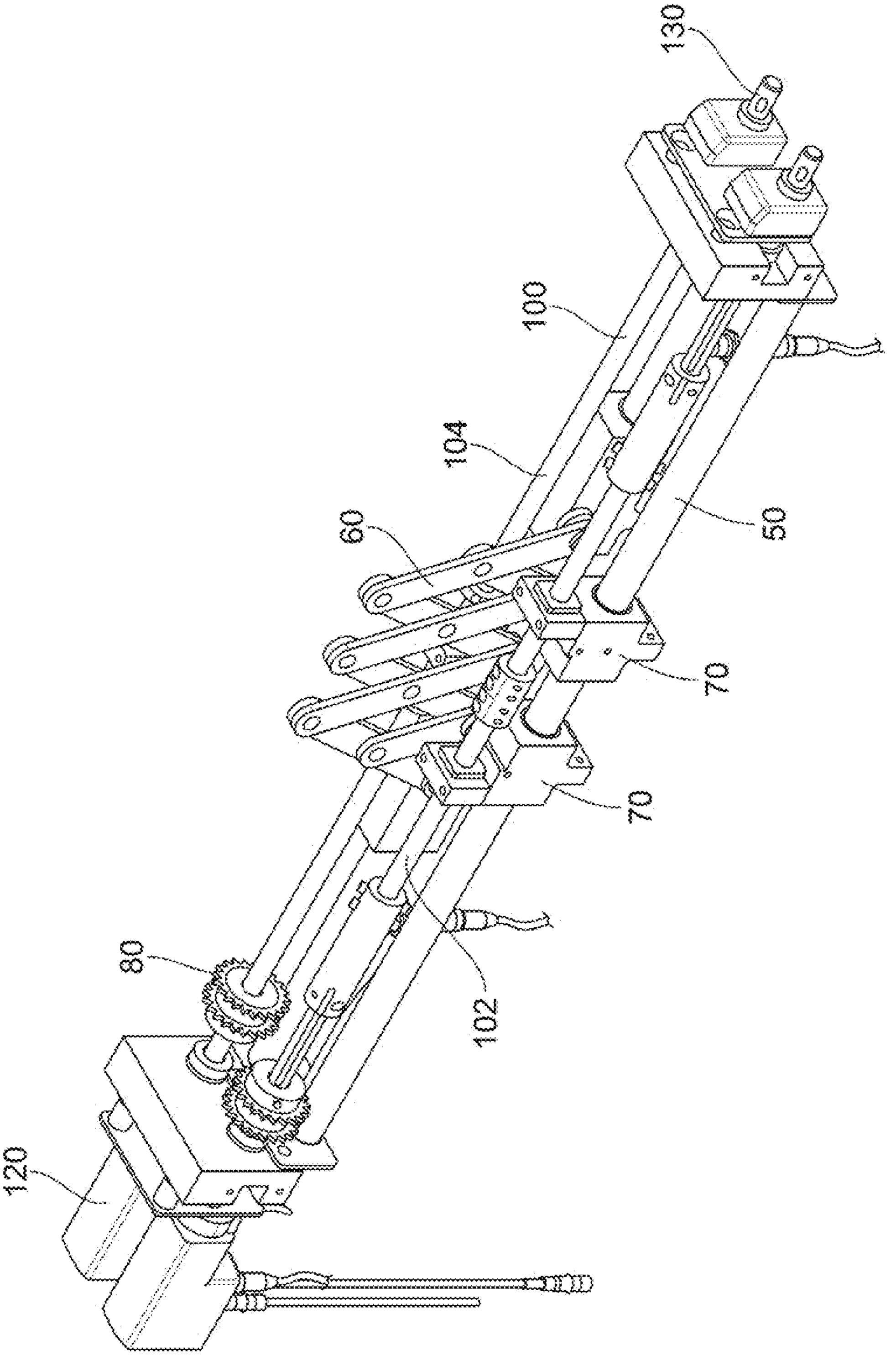
FIG. 3 shows a front perspective view of a portion of an automatic lane adjustment system according to one embodiment.

The present invention provides a system, apparatus and method for automatically adjusting lanes of a conveyor system. A conveyor system according to the subject invention is shown in FIGS. 1-3. The subject conveyor system may be used in connection with conventional conveyor systems including rollers, powered belts, skatewheels, chains, flexible conveyors, and others.

Conventional conveyor systems typically include fixed lanes that must be disassembled and reinstalled with new spacers to permit changeover of container sizes and configurations. The subject system preferably installs on existing systems and prevents or minimizes the need for time consuming changeover.

As shown in FIGS. 1-3, a conveyor 10 includes opposing outer side walls 20 and a plurality of uprights 30 along the side walls 20. The side walls 20 are intended to delimit the total width of the conveyor 10 and contain conveyed product within the conveyor 10.

Two or more lane dividers 40 are preferably positioned between the side walls 20. The lane dividers 40 are preferably generally rigid bars or rails that provide discrete lane paths for conveyed products.

One or more rails 50 are preferably positioned between opposite uprights. The rails 50 may be slide rails or a similar arrangement that permits movement of the subject mechanisms across the rails 50 and generally perpendicular to a direction of travel of the conveyor 10. Linear slides 70 may be positioned along the rails to enable smooth linear motion of the lane dividers 40. The linear slides 70 are preferably each connected to a divider 40 to enable free sliding movement of the respective dividers 40 into a desired position.

A scissor mechanism 60 is preferably positioned along the rails 50 and connected with respect to the lane dividers 40. The scissor mechanism 60 is configured to independently adjust lane width from the offset distance. As used herein, "offset" is the distance a lane arrangement is from a centerline (or a datum line) of the conveyor 10. As such, the scissor mechanism 60 can adjust both a distance within the lane and a distance between lanes, preferably independently. In an embodiment shown in the figures, the lane width is adjustable with the scissor mechanism 60 and the offset is adjustable with the linear slide 70 and rails 50. In this embodiment, the lane width and the offset are independently adjustable. The scissor mechanism 60 and the lane dividers 40 are preferably configured to maintain equal spacing of all lane widths, although differing widths may be preferable in some applications.

The scissor mechanism 60 may be driven by one or more motors 120 configured to move the scissor mechanism. Alternatively, or in addition, a hand crank 130 may be configured to move the scissor mechanism.

In one embodiment of this invention, a plurality of sprockets 80 may be positioned along the side walls 20. The plurality of sprockets 80 may be connected to a chain 90 configured to move the scissor mechanism 60, preferably in a synchronized fashion across the system.

The conveyor system preferably further includes driven ACME threads 102, 104 extending transversely across the lanes in association with each rail 50. Specifically, a width ACME thread 102 and an offset ACME thread 104 are positioned between each opposite upright 30, each dedicated to adjusting the lane width and the offset, respectively. The ACME threads 102, 104 are preferably non-backdriveable so as to prevent movement of the width or offset generated by the flow of conveyed products.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A conveyor system comprising:
- a conveyor having opposing outer side walls and a plurality of uprights along the side walls;
- two or more lane dividers positioned between the side walls;
- one or more rails positioned between opposite uprights;
- a scissor mechanism positioned along the rails and connected with respect to the lane dividers, the scissor mechanism configured to independently adjust lane width from an offset distance; and
- a plurality of sprockets positioned along the side walls, the plurality of sprockets connected to a chain configured to move the scissor mechanism and/or the offset.

2. The conveyor system of claim 1 further comprising at least one linear slide engaged with the rails.

3. The conveyor system of claim 2 wherein the lane width is adjustable with the scissor mechanism and the offset is adjustable with the linear slide.

4. The conveyor system of claim 3 wherein the lane width and the offset are independently adjustable.

5. The conveyor system of claim 1 wherein the scissor mechanism and the lane dividers are configured to maintain equal spacing of all lane widths.

6. The conveyor system of claim 1 further comprising a width ACME thread and an offset ACME thread positioned between each opposite upright, each dedicated to adjusting the lane width and the offset, respectively.

7. The conveyor system of claim 6 wherein the width ACME thread is non-backdriveable.

8. The conveyor system of claim 1 further comprising one or more motors configured to move the scissor mechanism.

9. The conveyor system of claim 1 further comprising a hand crank configured to move the scissor mechanism.

10. A conveyor system comprising:
- a conveyor having opposing outer side walls and a plurality of uprights along the side walls;
- two or more lane dividers positioned between the side walls;
- one or more rails positioned between opposite uprights;
- a scissor mechanism positioned along the rails and connected with respect to the lane dividers, the scissor mechanism configured to independently adjust lane width from an offset distance; and
- a width ACME thread and an offset ACME thread positioned between each opposite upright, each dedicated to adjusting the lane width and the offset, respectively.

11. The conveyor system of claim 10 further comprising a plurality of sprockets positioned along the side walls and configured to move the scissor mechanism and/or the offset.

12. The conveyor system of claim 10 wherein the scissor mechanism and the lane dividers are configured to maintain equal spacing of all lane widths.

13. The conveyor system of claim 10 further comprising at least one linear slide engaged with the rails.

14. The conveyor system of claim 13 wherein the lane width is adjustable with the scissor mechanism and the offset is adjustable with the linear slide.

15. The conveyor system of claim 14 wherein the lane width and the offset are independently adjustable.

16. The conveyor system of claim 10 wherein the width ACME thread is non-backdriveable.

17. The conveyor system of claim 10 further comprising one or more motors configured to move the scissor mechanism.

18. The conveyor system of claim 10 further comprising a hand crank configured to move the scissor mechanism.

* * * * *